Nov. 24, 1931. F. G. CULP 1,833,207
SANITARY PAPER CONTAINER OR RECEPTACLE
Filed Nov. 26, 1929 2 Sheets-Sheet 1
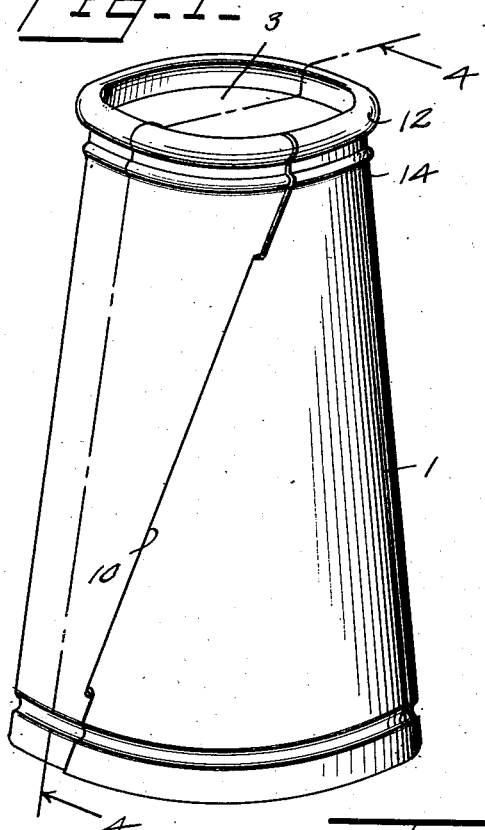
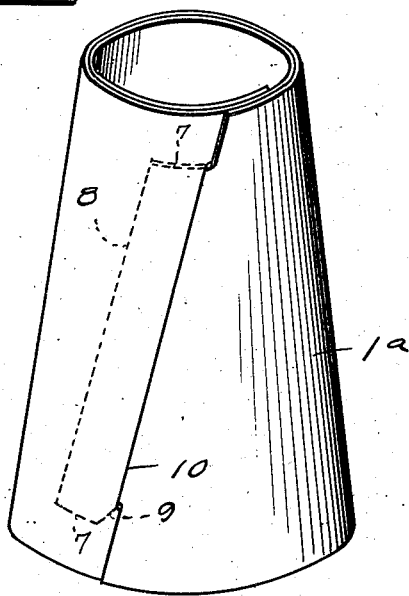
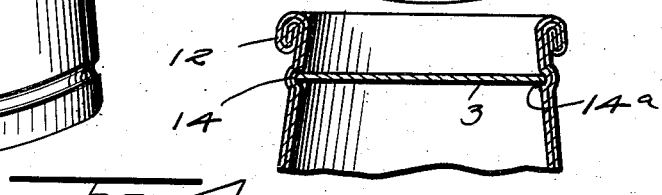
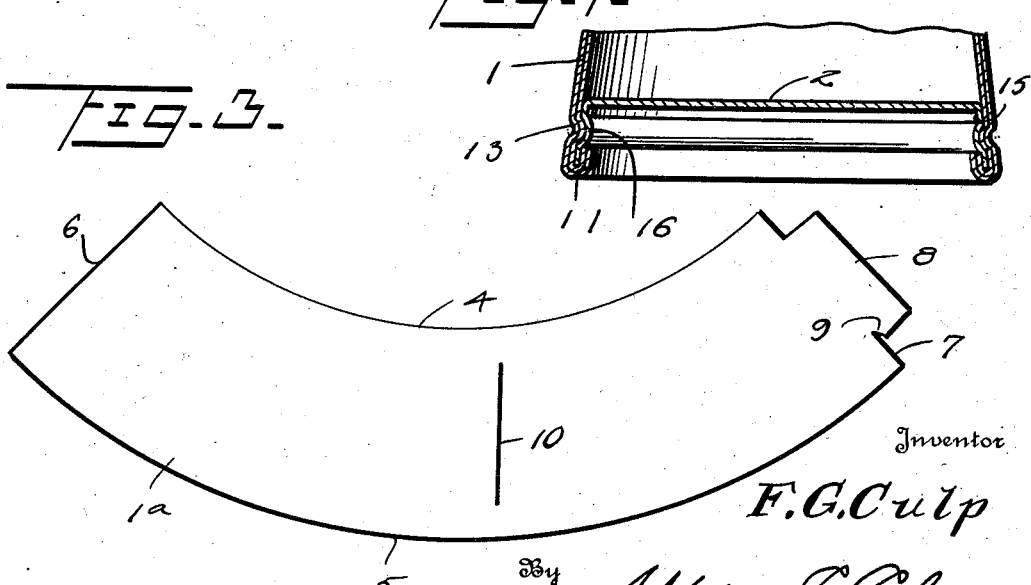
Inventor
F. G. Culp
By Watson E. Coleman
Attorney Nov. 24, 1931.  F. G. CULP  1,833,207
SANITARY PAPER CONTAINER OR RECEPTACLE
Filed Nov. 26, 1929  2 Sheets-Sheet 2
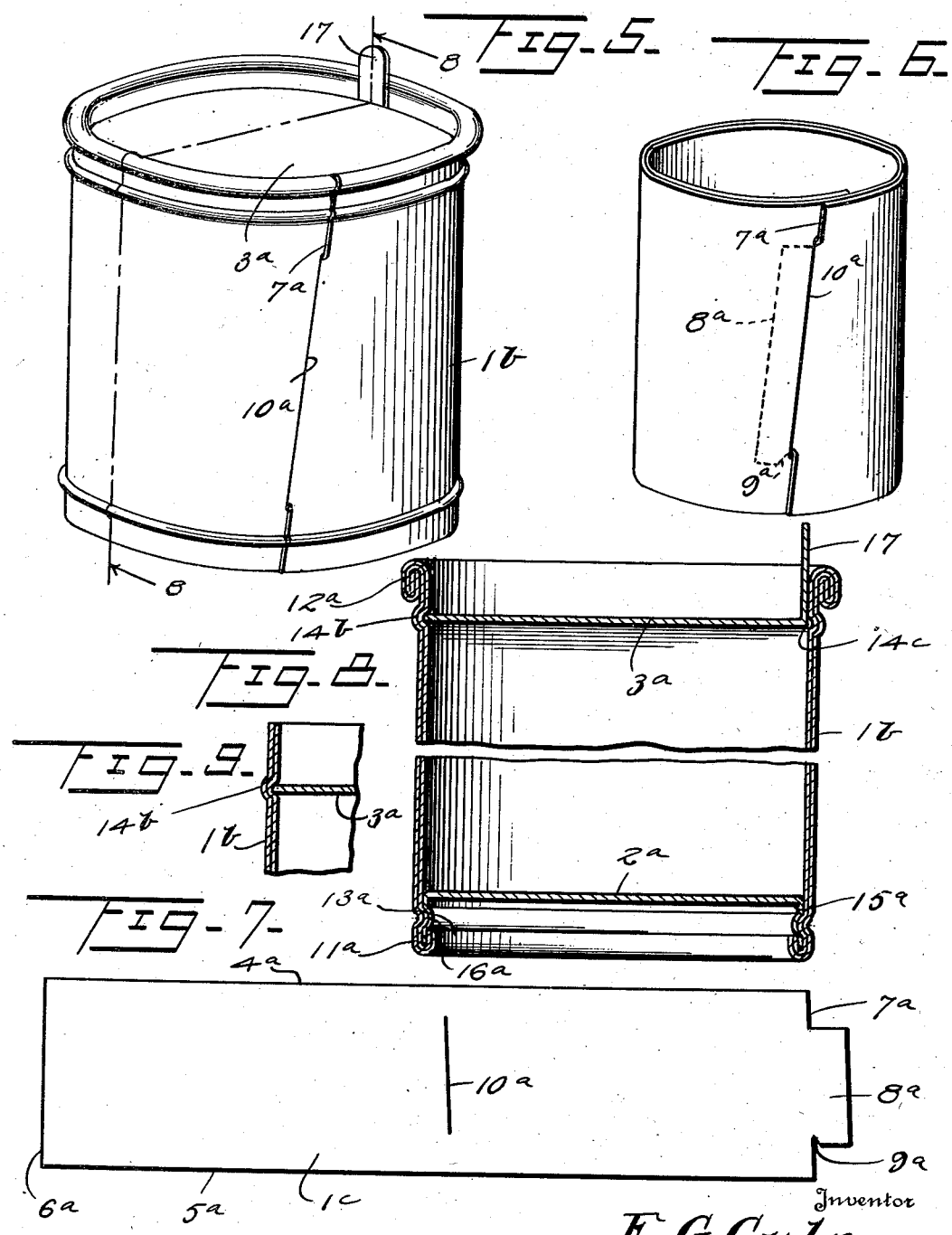
Inventor
F. G. Culp
By Watson E. Coleman
Attorney Patented Nov. 24, 1931

1,833,207

UNITED STATES PATENT OFFICE

FRANK G. CULP, OF EAGLE ROCK, CALIFORNIA, ASSIGNOR OF ONE-HALF TO EDITH A. ROOT, OF LOS ANGELES, CALIFORNIA

SANITARY PAPER CONTAINER OR RECEPTACLE

Application filed November 26, 1929. Serial No. 409,924.

This invention relates to containers or receptacles, and more particularly to a sanitary container or receptacle for liquid, semi-liquid and solid foods and the like.

The invention has for one of its objects to avoid the danger of the transmission of diseases incident to the use of glass bottles for the distribution of milk and cream to consumers and to avoid the expense incident to the breakage of the bottles and to the washing of the same, and to attain these ends comprehends the provision of a water and moisture-proof paper receptacle which shall be adapted to be manufactured and sold at such low cost, as compared with the initial cost of a milk or cream bottle, as to permit it to be thrown away by the consumer after the milk or cream has been removed therefrom.

The invention further comprehends the provision of frusto-conical and cylindrical containers or receptacles which shall be similarly constructed, of which the former shall be especially adapted to be used for the purpose of distributing milk, cream and other liquids, and of which the latter shall be especially adapted to be used for the purpose of distributing semi-liquid and solid foods and the like.

The invention further comprehends the provision of a conical container or receptacle which shall be adapted to be closed by a disc and which shall be adapted to permit the closure disc to be applied thereto by the machines now employed to apply closure discs to milk and cream bottles.

The invention is hereinafter fully described and claimed, and illustrated in the accompanying drawings, wherein:—

Figure 1 is a perspective view of the frusto-conical container or receptacle;

Figure 2 is a perspective view of the body of the receptacle or container;

Figure 3 is an elevational view of the blank from which the body of the container or receptacle is made;

Figure 4 is a sectional view taken on the plane indicated by the line 4—4 of Figure 1;

Figure 5 is a perspective view of the cylindrical container or receptacle;

Figure 6 is a perspective view of the body of this container or receptacle;

Figure 7 is an elevational view of the blank from which this body is formed;

Figure 8 is a sectional view taken on the plane indicated by the line 8—8 of Figure 5, and Figure 9 is a sectional view illustrating a slight modification of the cylindrical container or receptacle.

Referring in detail to the drawings, and particularly to Figures 1 to 4, 1 designates the body, 2 the bottom, and 3 the closure of the receptacle which is especially adapted to be used for the purpose of distributing milk and cream and other liquids. The body 1 is of frustro-conical formation, and it, the bottom 2 and the closure 3 are made of paper treated with paraffin in a manner to render the container or receptacle water and moisture-proof.

The body 1 is made from the blank 1ª shown in Figure 3 and having a concave upper side edge 4, a convex lower side edge 5, and downwardly diverging end edges 6 and 7. The blank 1ª is provided at its end 7 with a tongue 8 which has its lower edge notched, as at 9. The blank 1 is provided between its end 7 and its transverse center with a slot 10 which terminates short of the upper edge 4 and lower edge 5 of the blank and is adapted, after the blank is rolled into body formation, to receive the tongue 8. The free edge of the tongue 8 is substantially equal in length to the slot 10, and the tongue gradually increases in length in the direction of its attached edge, whereby to permit the tongue to be readily passed through the slot and to establish an interlocking connection between the lower edge of the tongue and the bottom wall of the slot. This connection is established by the reception of the bottom wall of the slot 10 by the notch 9 of the tongue 8. As the slot 10 is not located centrally between the edges 6 and 7 but nearer the edge 6 than the edge 7, the inner end of the body overlaps the tongue 8 and slot 10, as will be seen from Figure 2.

The inner and outer ends of the body 1 extending circumferentially beyond each other and are closely related, the lower end of the body 1 is rolled upwardly and inwardly to provide a bead 11, and the upper end of the body is rolled downwardly and outwardly to provide a bead 12. The body 1 is formed near its lower end to provide an inner annular shoulder 13 and it is formed near its upper end to provide an outer annular shoulder 14. The beads 11 and 12 hold the inner and outer wall portions of the body 1 in close contact and against any tendency to separate axially or radially. The upper edge of the tongue 8 contacts with the top wall of the slot 10 and the upper wall of the notch 9 contacts with the lower wall of the slot, to the end that the tongue may also function to hold the inner and outer wall portions of the body 1 against axial separation. The shoulder 13 is located immediately above the bead 11, and the shoulder 14 is located immediately below the bead 12, and cooperate with the beads in reinforcing the lower and upper ends of the body 1. As the inner and outer wall portions of the body 1 are held against separation by the beads 11 and 12 and by the tongue 8, and as the beads and shoulders 13 and 14 reinforce the lower and upper ends of the body, the body although made of paper is strong enough to withstand any pressure to which it may be subjected while being filled and capped by a milk bottle filling and capping machine.

The bottom 2 is arranged within the body 1 above and in close proximity to the shoulder 13, and it is provided with a downwardly extending flaring flange 15 which has its lower edge portion arranged within the bead 11 and is provided between its edges with an annular groove 16 for the reception of the shoulder 13. The arrangement of the lower edge portion of the flange 15 in the bead 11, and the arrangement of the shoulder 13 in the groove 16, establishes a firm and substantial connection between the body 1 and bottom 2. The closure 3 is in the form of a disc and has its edge arranged within the inner annular groove 14$^a$ provided as the result of the formation of the shoulder 14. The closure disc 3 is adapted to be applied by the machines now used to apply the closure disc of glass milk bottles.

The container or receptacle shown in Figures 5 to 8 comprises a body 1$^b$, a bottom 2$^a$, and a closure disc 3$^a$, and is especially adapted for the distribution of semi-liquid and solid foods. The body 1$^b$ is of cylindrical formation, but is otherwise similar to the body 1, 11$^a$ designating its lower inner bead, 12$^a$ its upper outer bead, 13$^a$ its lower inner shoulder, and 14$^b$ its upper outer shoulder. The blank 1$^c$ from which the body 1$^a$ is formed, has straight parallel upper and lower edges 4$^a$ and 5$^a$, respectively. The edge 6$^a$ of the blank 1$^c$ is arranged at right angles to the edges 4$^a$ and 5$^a$. The edge 7$^a$ of the blank 1$^c$, together with the slot 10$^a$ for the reception of the tongue 8$^a$, is arranged at an inclined angle with respect to the edges 4$^a$ and 5$^a$, and the tongue 8 is provided with a locking notch 9$^a$.

The bottom 2$^a$ has its flange 15$^a$ engaged by the bead 11$^a$ and is provided with a groove 16$^a$ for the reception of the shoulder 13$^a$. The closure disc 3$^a$ has its edge arranged in the groove 14$^c$ provided as the result of the formation of the shoulder 14$^b$, and it is provided with a tab 17 through the medium of which it may be readily withdrawn. If desired, the upper bead may be omitted from this container, as shown in Figure 9.

After the bodies and bottoms of the containers or receptacles are formed and assembled, they are subjected to a bath in paraffin wax at a temperature of 215° F. in order to render them liquid and moisture-proof, the closures for the receptacles or containers being also subjected to a similar bath at a similar temperautre.

As the bodies of the receptacles or containers are each made from a single strip of paper, it will be apparent that the receptacles or containers may be produced at a comparatively low cost. As the inner ends of the blanks overlap the connection between the blanks and their outer ends, due to the provision of the bodies with the lower beads and shoulders and the upper beads and shoulders, and due to the manner in which the bodies are impregnated with wax, the receptacles or containers will be absolutely water and moisture-proof and possess comparatively great strength. The engagement of the lower beads and the shoulders with the flanges of the bottoms also materially assist in strengthening the receptacles or containers and rendering them moisture and water-proof.

While I have described the principle of the invention, together with the article which I now consider the preferred embodiment thereof, it is to be understood that the article shown is merely illustrative and that such changes may be made, when desired, as fall within the scope of the invention as claimed.

I claim:—

A paper container or receptacle, comprising a body consisting of inner and outer spirally arranged wall portions contacting with each other and having their inner and outer ends extending beyond each other and closely related, said outer wall portion being provided near said outer end with a diagonal slot, a tongue carried by said outer end and extending through said slot, the tongue being provided in its lower end near its attached edge with a notch adapted to receive the bottom wall of said slot and having its top wall contacting with said bottom wall, the upper edge of the tongue contacting with the top wall of said slot, and the lower edges of said inner and outer wall portions being rolled inwardly and upwardly and the upper edges of said portions being rolled downwardly and outwardly to provide lower and upper beads adapted to hold said wall portions in close contact against radial separation and cooperating with said tongue to hold said portions against axial separation, said wall portions being offset to provide an inner annular shoulder located immediately above the lower bead and said wall portions being offset to provide an outer annular shoulder and an inner annular groove immediately below the upper bead, a bottom located within the body and provided with a downwardly extending flange having its lower portion positioned in the lower bead, the flange being provided with an annular groove receiving the inner shoulder, and a closure disk located within the body with its edge engaged in said first annular groove.

In testimony whereof I hereunto affix my signature.

FRANK G. CULP.